United States Patent
Horoszczak et al.

(10) Patent No.: US 11,761,709 B2
(45) Date of Patent: Sep. 19, 2023

(54) HEAT EXCHANGER

(71) Applicant: Hamilton Sundstrand Corporation, Charlotte, NC (US)

(72) Inventors: Adam Horoszczak, Wroclaw (PL); Rafal Lewandowski, Żarów (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 204 days.

(21) Appl. No.: 16/704,041

(22) Filed: Dec. 5, 2019

(65) Prior Publication Data
US 2021/0041179 A1   Feb. 11, 2021

(30) Foreign Application Priority Data
Jul. 2, 2019   (EP) .................................. 19461552

(51) Int. Cl.
   *F28D 7/02*   (2006.01)
   *B23P 15/26*   (2006.01)
   *F28D 1/047*   (2006.01)

(52) U.S. Cl.
   CPC .............. *F28D 7/024* (2013.01); *B23P 15/26* (2013.01); *F28D 1/0472* (2013.01); *F28D 1/0473* (2013.01)

(58) Field of Classification Search
   CPC ........ F28D 7/022; F28D 7/024; F28D 1/0472; F28D 1/0473
   See application file for complete search history.

(56) References Cited

U.S. PATENT DOCUMENTS

| | | | |
|---|---|---|---|
| 1,965,553 A | | 7/1934 | Lear |
| 2,346,822 A | * | 4/1944 | Clancy .................... F28D 7/005 165/142 |
| 3,163,210 A | * | 12/1964 | Horrocks ................ F28D 7/022 165/145 |
| 3,228,463 A | * | 1/1966 | Kagi ...................... F28F 9/0219 165/158 |

(Continued)

FOREIGN PATENT DOCUMENTS

| | | |
|---|---|---|
| DE | 202008000640 U1 | 5/2008 |
| EP | 3124906 B1 | 2/2017 |

(Continued)

OTHER PUBLICATIONS

European Search Report for Application No. 19461552.2, dated Dec. 12, 2019, 9 pages.

Primary Examiner — Jianying C Atkisson
Assistant Examiner — For K Ling
(74) Attorney, Agent, or Firm — CANTOR COLBURN LLP (57) ABSTRACT

A heat exchanger extends between a first end and a second end and includes: a central core; and a heat exchange section; wherein the heat exchange section comprises: a primary flow inlet; a secondary flow inlet; a primary flow outlet; a secondary flow outlet; a plurality of primary flow tubes for conveying a primary flow from the primary flow inlet to the primary flow outlet; and a plurality of secondary flow tubes for conveying a secondary flow from the secondary flow inlet to the secondary flow outlet. The primary flow tubes and the secondary flow tubes are grouped together to form at least one strand; and wherein the at least one strand is helically wrapped around the central core.

12 Claims, 6 Drawing Sheets

(56) References Cited

U.S. PATENT DOCUMENTS

| | | |
|---|---|---|
| 4,451,960 A | 6/1984 | Molitor |
| 4,588,026 A | 5/1986 | Hapgood |
| 9,709,351 B2 * | 7/2017 | Gaiser .................. F28D 7/0066 |
| 10,018,424 B2 | 7/2018 | Zaffetti et al. |
| 10,041,745 B2 | 8/2018 | Poltorak |
| 2006/0005955 A1 * | 1/2006 | Orr ........................ F28F 13/06 165/108 |
| 2010/0126213 A1 | 5/2010 | Peng et al. |
| 2011/0289905 A1 * | 12/2011 | Acre ........................ F01N 5/02 60/320 |
| 2017/0205146 A1 * | 7/2017 | Turney .................. F28D 7/0033 |
| 2017/0292791 A1 | 10/2017 | Zaffetti et al. |
| 2017/0370652 A1 | 12/2017 | Lopes |
| 2018/0051934 A1 | 2/2018 | Wentland et al. |
| 2018/0164047 A1 | 6/2018 | Fard |
| 2018/0283794 A1 | 10/2018 | Cerny et al. |
| 2018/0283795 A1 | 10/2018 | Cerny et al. |

FOREIGN PATENT DOCUMENTS

| | | | |
|---|---|---|---|
| EP | 3193125 B1 | 7/2017 | |
| EP | 3358271 A1 * | 8/2018 | ............. F24H 1/181 |
| JP | S5188866 U | 7/1976 | |
| JP | 2003254684 A | 9/2003 | |

* cited by examiner

HEAT EXCHANGER

FOREIGN PRIORITY

This application claims priority to European Patent Application No. 19461552.2 filed Jul. 2, 2019, the entire contents of which is incorporated herein by reference.

TECHNICAL FIELD

The invention relates to a heat exchanger and to a method of manufacturing a heat exchanger.

BACKGROUND

Heat exchangers for transfer of heat between different fluids are very widely used and exist in various forms. Typically heat exchangers are arranged for flow of a primary fluid and a secondary fluid with heat being transferred between the two fluids as they flow through the device. Multi-stream heat exchangers for exchanging heat between more than two fluids also exist in the prior art. Heat exchangers are required within aircraft structures to regulate temperatures of working fluids as well as to scavenge heat from one system for use in another. Every heat exchanger consumers significant space within an aircraft structure, in certain areas of the aircraft structure space is at a premium and it is therefore desirable to optimise the size of each component fit them together in a way that minimises the space taken.

A conventional plate-fin heat exchanger consumes significant space due to its box-like design. This makes it difficult to accommodate other components within the space. In some instances it may not be possible to mount a conventional plate-fin heat exchanger, due to the strict space requirements.

In addition to the space requirements, conventional heat exchangers also require complicated mounting features as they need to be connected to the inlet and outlet ducts and they also need to be supported within the structure.

Furthermore, there may be some instances or applications where heat transfer is not required at all times. Therefore, there may also be a need to provide a means for conveying a fluid from one area to another via a heat exchange section, or via a simple duct without any heat exchange.

There is therefore a desire to provide a heat exchanger that can be accommodated in areas where there is limited available space and that can be installed without complicated mounting arrangements.

US 2018/0051934 discloses a heat exchanger including a monolithically formed body defining at least two channels configured to allow fluid therethrough. One of the two channels is at least partially wound around, or within, the other channel.

US 2017/0292791 discloses a heat exchanger including two fluid pathways spirally engaged with each other to facilitate thermal energy exchange between the fluids in the two fluid pathways.

US 2017/0370652 discloses an arrangement of hot and cold coiled channels forming rows and columns within a heat exchanger.

SUMMARY

Viewed from a first aspect, there is provided a heat exchanger extending between a first end and a second end, the heat exchanger comprising; a central core; and a heat exchange section; wherein the heat exchange section comprises: a primary flow inlet, a secondary flow inlet, a primary flow outlet, a secondary flow outlet, a plurality of primary flow tubes for conveying a primary flow from the primary flow inlet to the primary flow outlet, and a plurality of secondary flow tubes for conveying a secondary flow from the secondary flow inlet to the secondary flow outlet, wherein the primary flow tubes and the secondary flow tubes are grouped together to form at least one strand that is wrapped around the central core in a helical manner.

This offers the technical advantage of providing a heat exchanger that fits in a relatively confined space. In particular, this type of heat exchanger may be able to form a duct and can therefore be placed in an area where a duct would already be present, thus no additional space is required to incorporate a heat exchanging function within that area. The heat exchanger may thus be a duct heat exchanger, i.e. a heat exchanger formed with a duct shape, such as an elongate pipe shape. There is also no need for the conventional plate-fin heat exchangers to be housed in a compact environment, hence the space taken up by the heat exchanger will be significantly reduced.

These technical advantages are of particular benefit to the aerospace industry, where optimising the size of components is important in both aircraft efficiency and subsequently reducing overall operating costs. Additionally, the helical arrangement of the at least one strand provides a large heat transfer surface within a small envelope.

Furthermore, as the heat exchanger of the present invention may replace an existing duct, then there is no need for additional mounting features compared to the existing mountings for holding a duct. This means the time taken to assemble the heat exchanger is reduced, resulting in reduced manufacturing costs. Minimising costs is beneficial for numerous applications, in particular the aerospace industry.

The primary flow may be the "hot" flow, and the secondary flow may be the "cold" flow. Alternatively, the primary flow may be the "cold" flow and the secondary flow may be the "hot" flow.

The heat exchanger may comprise an outer shell. The outer shell may enclose the heat exchange section and the central core.

The secondary flow inlet and outlet may be on the surface of the outer shell and may be perpendicular to the outer shell of the duct. The secondary flow inlet and secondary flow outlet may be positioned near the respective first end and second end of the heat exchanger. Alternatively the secondary flow inlet and secondary flow outlet may be positioned at other points along a longitudinal direction of the heat exchanger.

The secondary flow inlet and secondary flow outlet may comprise tubular portions extending from an outer surface of the heat exchanger, such as an outer surface of the outer shell, where present. The tubular portions of the secondary flow inlet and secondary flow outlet may be for connecting to other ducts for supplying the secondary fluid to the heat exchanger.

The tubular portion of the secondary flow inlet and secondary flow outlet may be circular in cross section. Alternatively the secondary flow inlet and secondary flow outlet may be polygonal in cross section.

There may be a plurality of secondary flow inlets and secondary flow outlets and corresponding tubular portions extending along the length of the heat exchanger.

There may be multiple strands, each helically wrapped around the core. This further increases the heat transfer taking place within the same length of duct as it provides a larger contact surface between the primary and secondary fluids. It may also increase the volume of fluid transferred. The heat exchanger may, for example, comprise six strands wrapped around the core. It will be appreciated that if the core is of similar size to the strands then it is possible to wrap six strands in a space efficient manner, especially if the strands are arranged to closely fit and/or tessellate in that configuration, such as with strands using a circular or hexagonal cross-section.

Each strand may comprise a plurality of primary flow tubes and a plurality of secondary flow tubes. This will allow more fluid to be transported by the heat exchanger and also provide additional fluid through which heat can be transferred. Additionally, increasing the number of flow tubes increases the contact surface area for heat transfer to take place. The strand(s) may, for example, comprise six flow tubes wrapped around a strand core or around a central flow tube, with the latter option hence involving seven flow tubes in the strand. In the case of a central flow tube then the central flow tube may transfer a primary flow and hence may be a primary flow tube. Alternatively, the central flow tube may transfer a secondary flow and may hence be a secondary flow tube. As another alternative, a solid central strand core may be used. A solid strand core may provide structural integrity to each strand.

It will be appreciated that if the strand core or central flow tube is of similar size to the other flow tubes then six outer flow tubes may be used in a space efficient manner with those six being wrapped around the centre, especially if the flow tubes are arranged to closely fit and/or tessellate in that configuration, such as with strands using a circular or hexagonal cross-section. In the case of a hexagonal configuration and multiple strands then added flow tubes may be used to fill spaces between adjacent strands to maximise the use of space within a cylindrical volume.

In each strand there may be an equal amount of primary and secondary flow tubes. Alternatively, in each strand there may be a greater number of primary flow tubes than secondary flow tubes. Alternatively, in each strand there may be a greater number of secondary flow tubes than primary flow tubes. The number of primary and secondary tubes may be determined depending on the heat transfer requirements. In applications where the hot fluid requires significant cooling, more cold flow paths are required, and vice versa.

The flow tubes of each strand may be arranged so that the strand cross section forms a hexagonal shape. The flow tubes may alternate between the primary flow tube and the secondary flow tube about the perimeter of the strand cross section.

The wall thickness of each primary flow tube and secondary flow tube may be less than 1 mm in thickness. This will increase the efficiency of the heat transfer. The primary flow tube and the secondary flow tubes may be in contact with each other. Alternatively there may be a gap between the outer walls of the primary flow tubes and the secondary flow tubes. Optionally the gap between the outer walls may be less than 1 mm.

Each strand may have a secondary flow inlet and secondary flow outlet. If there is a plurality of strands there will be a plurality of secondary flow inlets and a plurality of secondary flow outlets. Each strand may have a primary flow inlet and primary flow outlet. If there is a plurality of strands there will be a plurality of primary flow inlets and a plurality of primary flow outlets. Optionally the heat exchanger includes one or more manifold structures to direct the flow from a common inlet flow path into the plurality of flow inlets and/or to direct the flow from the plurality of flow outlets into a common outlet flow path. Thus, for example, each strand may have a primary inlet manifold and a primary outlet manifold for the flow between a primary flow inlet and a primary flow outlet and the plurality of primary flow tubes of the strand may all connect through the primary inlet and outlet manifolds. Alternatively or additionally, each strand may have a secondary inlet manifold and a secondary outlet manifold for the flow between a secondary flow inlet and a secondary flow outlet and the plurality of secondary flow tubes of the strand may all connect through the secondary inlet and outlet manifolds.

The directions of flow in each strand may be the same, i.e. the primary flow and the secondary flow in each strand may be conveyed in the same longitudinal direction along a length of the duct. Alternatively, the secondary fluid may travel in one longitudinal direction in the strand and the secondary fluid in the strand may travel in the opposite longitudinal direction along the strand. Where multiple strands are used then the primary and secondary flow directions may be similar in each strand, or different strands may use oppose flow directions.

The flow tubes in the strand(s) may be twisted together such that the strand wraps around the central core whilst the tubes twist around a centre of the strand. By twisting the primary flow tubes and secondary flow tubes together a longer flow path is provided for the same length of strand. This increases the amount of contact between the primary fluid and secondary fluid and thus increases the heat transfer. The combination of twisting the tubes in the strands and then wrapping the strands around the central core also serves to avoid variations in length between the different tubes. This twisting and wrapping arrangement may for example form a configuration similar to fibres within a rope.

The heat exchanger may include multiple levels of strands, with the smallest strands comprising a plurality of primary flow tubes and a plurality of secondary flow tubes, then larger strands comprising a plurality of the smallest strands, and optionally these larger strands may be mid-sized strands with still larger strands comprising a plurality of the mid-sized strands. It will be appreciated that yet further levels may be added, with the heat exchanger thus having a fractal form with repeated elements of reducing/increasing scale. In each case the strands may have a twisted form as well as being wrapped around the central core. Thus, in an example with two levels of strands the heat exchanger may consist of multiple first level strands helically wrapped around the central core, where each first level strand comprises multiple second level strands, which can optionally be twisted, such as being helically wrapped around a centreline of the first level strands. Furthermore, each second level strand may comprise at least one primary flow tube and at least one secondary flow tube grouped together to form the second level strand.

There may be three or more levels of strands within the heat exchanger. The final, smallest, level of strand may comprise the plurality of primary flow tubes and the plurality of secondary flow tubes. In an example with three levels of strands the heat exchanger may consist of multiple first level strands helically wrapped around the central core, where each first level strand comprises multiple second level strands, which can optionally be twisted, such as being helically wrapped around a centreline of the first level strands. Furthermore, each second level strand may comprise multiple third level strands, which can optionally be twisted, such as being helically wrapped around a centreline of the second level strands. Finally, each third level strand may consist of at least one primary flow tube and at least one secondary flow tube grouped together to form the second level strand.

By providing additional levels of strands, the heat transfer is increased for the same length and diameter/width of heat exchanger, as the contact surface area between the primary flows and secondary flow paths is increased.

The heat exchanger may be provided with a third flow to be transferred in a third flow tube. In that case the strands may comprise one or more third flow tubes as well as the primary and secondary flow tubes.

The primary flow tubes and the secondary flow tubes may have a circular cross-section. Alternatively, the primary flow tubes and the secondary flow tubes may have a hexagonal cross-section.

The heat exchanger may be flexible. This allows the heat exchanger to fit into any interface, such as an interface for a duct, without modification to the existing components. The heat exchanger being flexible also allows the heat exchanger to thermally expand.

The heat exchanger may alternatively be rigid and may be a non-regular shape, for example it may comprise one or more bends along its length. This will further allow it to be accommodated in a wide range of areas without significant modification to the existing components.

The heat exchanger may be for use with any required combination of fluids, such as liquid-liquid, liquid-gas or gas-gas heat exchange. The heat exchanger may use air for heating or cooling of another fluid. In some examples the heat exchanger is for aerospace use and the invention thus extends to an aircraft including the heat exchanger device. In context of aerospace use the fluids may include two or more of: atmospheric air, cabin air, engine oil, generator oil, coolant, fuel and so on. Any combination of these fluids can be used within the same heat exchange device, it is not limited to two types of fluid. The fluid used depends on the requirements of the heat exchanger as different fluid will have different thermal and fluidic properties. Some fluid will move with a lower/higher velocity than others which may be preferable in certain situations to provide the necessary thermal transfer.

The flow paths may be arranged such that alternating fluid types are adjacent to each other. Alternatively, the same fluid types may be adjacent to each other if for example a greater amount of primary fluid is required.

The primary flow tubes and secondary flow tubes may have different cross-sectional areas. Alternatively the primary flow tubes and the secondary flow tubes may have the same cross-sectional area. This will depend on the required heat transfer and the amount of fluid being transferred through the heat exchanger. Increasing the cross-sectional area of one of the tubes results in a reduced flow velocity so the residency time for a given particle is increased which increases the thermal transfer of the heat exchanger. Decreasing the cross-sectional area of the tubes will result in an increased Reynolds number and may lead to more turbulent flow which will subsequently also increase the thermal transfer of the heat exchanger. The fluids used may have different flow characteristics and hence require different flow conditions. These characteristics can be accommodated by altering the cross sectional area of the flow tubes for each fluid.

The central core may be solid. This will provide structural support to the heat exchanger. Alternatively the central core may be hollow to form a bypass duct, which may be for the primary fluid or the secondary fluid. This is beneficial in instances where heat transfer is not required, or where maximum heat transfer is not required. Instead the fluid, or a portion of it, can be allowed to pass through the central core bypass duct without heat exchange with the other fluid. This further enhances the potential advantages of using the heat exchanger in the place of conventional ducts, such as where only occasional heat exchange may be required.

The central core may vary in size and may depend on the structural requirements of the heat exchanger, or the required amount of flow that may be required in the event of the central core being used as a bypass.

The heat exchanger may include a valve for opening and closing the bypass of the central core. When heat transfer is required the valve may be closed to allow the fluid to travel through the heat exchange circuit.

The heat exchanger may extend in a longitudinal direction between the first end and the second end. The primary flow inlet may be at the first end and the primary flow outlet may be at the second end, or vice versa. The secondary flow inlet may be at the opposite end of the duct compared to the primary flow inlet, and the secondary flow outlet may be at the opposite end of the duct compared to the primary flow outlet. Alternatively, the secondary flow inlet and the secondary flow outlet may be at the same end of the duct as the primary flow inlet and outlet respectively. This may depend on whether it is required for the primary flow and secondary flow to travel in the same or opposite directions.

The heat exchange section may extend along the entire length of the heat exchanger. Alternatively the heat exchange section may extend along a portion of the length of the heat exchanger, for example the heat exchange section may extend greater than 60% the length of the heat exchanger, optionally over 70% the length of the heat exchanger, optionally over 80% the length of the heat exchanger, optionally over 90% the length of the heat exchanger. Alternatively the heat exchange section may only extend less than 50% the length of the heat exchanger.

A central flow path may be present within the strand(s). The central flow path within each strand may transfer the primary fluid. Alternatively, the central flow path may transfer the secondary flow. As a further alternative, the central flow path may not transfer any fluid.

The heat exchanger may be a constant diameter along its entire length. This makes the heat exchanger easier to manufacture and improves the flow characteristics of the fluid through both the heat exchanger structure and the central core, when acting as a bypass. While the overall diameter of the heat exchanger may be constant along its length, the central core and the size of the heat exchange section may vary correspondingly.

Alternatively, the overall diameter of the heat exchanger may vary along its length. This can be used to accommodate pressure requirement at various points along the heat exchanger and provide better control. If the heat exchanger was made of flexible material, the heat exchanger may be allowed to expand accordingly as required. As the overall diameter of the heat exchanger varies, the central core may have a constant diameter along the length, and the size of the heat exchanger section may vary. Alternatively, the size of the heat exchange section may be constant along the length of the heat exchanger and the diameter of the central core may vary.

The diameter of the heat exchanger may be constant along the majority of the length and it may be different at the first end and the second end. The first end and second end of the heat exchanger may have the same diameter. Alternatively the first end may have a larger diameter than the second end, alternatively, the first end may have a smaller diameter than the second end. The diameter of the first end and second end will depend on the shape and size of the neighbouring components.

The overall heat exchanger cross section may be circular, alternatively the overall cross section of the heat exchanger may be an irregular shape. The alternative cross section shapes will allow the duct to be accommodated in confined spaces which may not allow for a circular cross section.

The material used will depend on the required strength and flexibility of the heat exchanger and the temperature of fluid to be transferred.

Exemplary materials that may be used are aluminium, steel, nickel, alloys or titanium. Other materials, not listed here, may also be used to manufacture the heat exchanger. Superalloys such as Inconel 625 may be suitable for high temperature applications. Aluminium may be suitable for low to medium temperature applications. Polymers may be suitable for low temperature applications. Polymers may also be used if it is desirable for the heat exchanger to be flexible.

The heat exchanger may be made from a single material. Alternatively, the central core may be a different material to the flow tubes. Alternatively or additionally the primary flow tubes and the secondary flow tubes may be different materials.

The invention according the first aspect is beneficial in that numerous parameters can be adjusted to modify the performance, these parameters include the number of flow tubes and strands, levels of the stands, length and diameter of the duct, shape and size of the cross section of the flow tubes and the materials used.

Viewed from a second aspect, the invention provides a method for manufacturing a heat exchanger extending between a first end and a second end, the method comprising: forming a central core and a heat exchange section; wherein the heat exchange section is formed with; a primary flow inlet; a secondary flow inlet; a primary flow outlet; a secondary flow outlet; a plurality of primary flow tubes for conveying a primary flow from the primary flow inlet to the primary flow outlet; and a plurality of secondary flow tubes for conveying a secondary flow from the secondary flow inlet to the secondary flow outlet; wherein the heat exchange structure is formed so that the primary flow tubes and the secondary flow tubes are grouped together to form at least one strand; and wherein the at least one strand is helically wrapped around the central core.

The method may include providing the heat exchanger with any of the features discussed above in connection with the first aspect.

The heat exchanger may be manufactured by a process of additive manufacturing. This allows for rapid production and for producing the complex shapes or the irregular geometries required. Additive manufacturing allows for the complex configuration described by the first aspect of the invention to be manufactured quickly in one printed part.

Additive manufacturing will also allow for design modifications to be easily implemented such as increasing the number of flow tubes or strands, or providing a bypass as opposed to a solid central core.

BRIEF DESCRIPTION OF THE FIGURES

Certain example embodiments of the invention are described below by way of example only and with reference to the accompanying drawings, in which.

DETAILED DESCRIPTION

Figure 1:
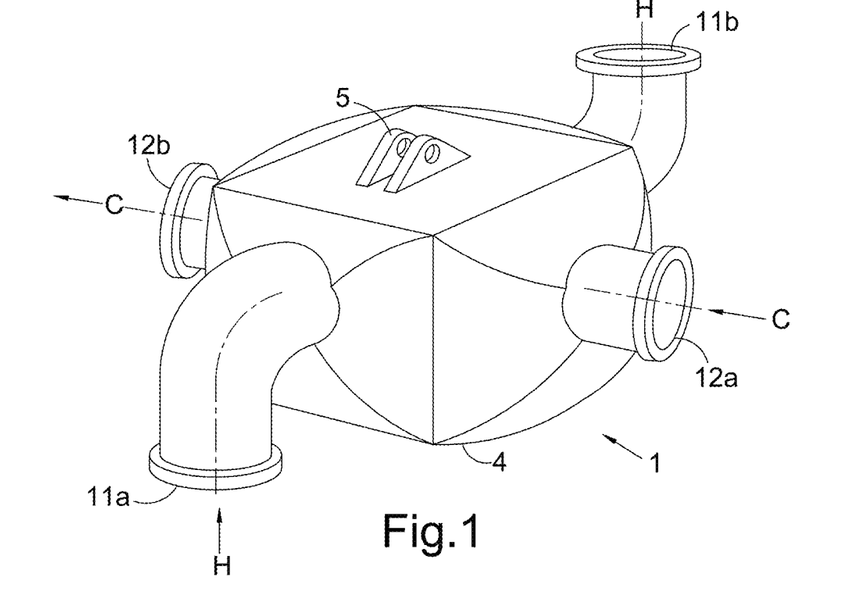
FIG. 1 is a perspective view of a conventional plate fin heat exchanger.

FIG. 1 shows a conventional plate fin heat exchanger 1 for use within an aircraft system. In the figure, the plate fin heat exchanger 1 has a first flow path for a hot fluid H and a second flow path for a cold fluid C. The hot and cold fluid flow paths H, C enter and exit the heat exchanger 1 via the inlets 11*a*, 11*b* and outlets 12*a*, 12*b*, the respective inlets and outlets being arranged opposite each other on a housing 4.

Within the housing 4 of the heat exchanger 1, the hot and cold fluid flow paths H, C intersect through a series of heat exchanger plates (not shown) to transfer heat. The exchange of heat might be, for example, to regulate the temperature of the hot fluid by extracting heat with the cold fluid. In the illustrated heat exchanger 1, the heat exchanger plates are located within the box-shaped, central part of the housing 16, and the fluid flows H, C are divided across a plurality of intersecting channels by headers provided in the curved portions of the housing 4, arranged every 90° around the housing 4.

This type of heat exchanger 1, while it is thermodynamically efficient, consumes a significant amount of space within an aircraft structure. It also adds weight to the aircraft structure and usually requires complex mounting arrangements. For example, a mounting arrangement may need to be provided within an already congested space for supporting the heat exchanger 1 via bracket 5.

Figure 2:
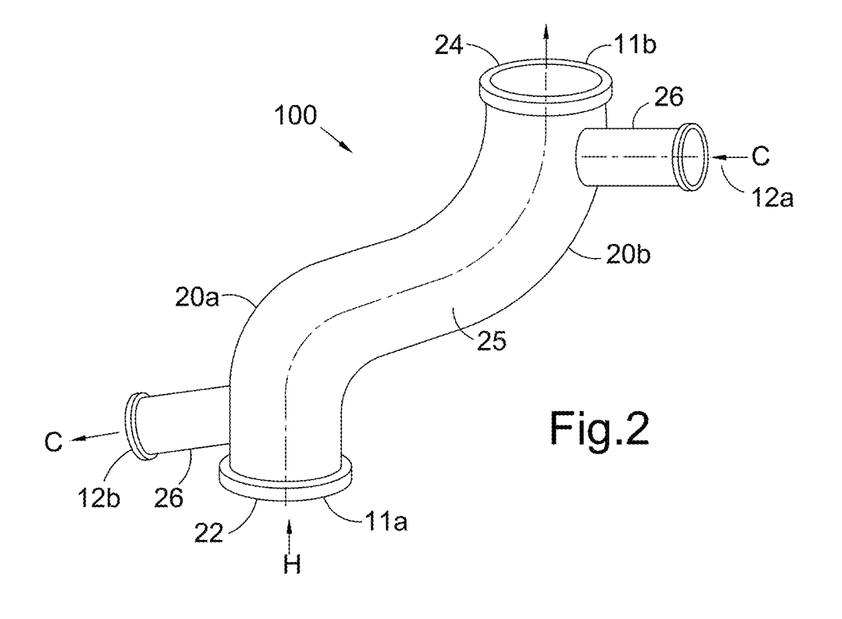
FIG. 2 is a perspective view of a duct incorporating a heat exchanger.

This conventional heat exchanger may be replaced with a modified heat exchanger 100 with a duct-like form, as shown in FIG. 2, where the duct-like form incorporates an integral heat exchanger. In this way, less space is needed than for the conventional heat exchanger 1. Moreover, the heat exchanger 100 allows an existing duct in an aircraft structure to be improved by replacing it for a duct 100 as described.

In the illustrated example of FIG. 2, the heat exchanger 100 follows an S-shape comprising two main bends 20*a*, 20*b* in different directions. However, the current disclosure is not limited to such shapes and other configurations (simpler as well as more complex) are contemplated.

Furthermore, the heat exchanger 100 may be flexible allowing it to form any desired shape to fit around existing components.

In FIG. 2, the outer shell 25 of the heat exchanger 100 is shown as being substantially constant diameter along its length. This would be a typical solution so that the heat exchanger 100 can be fit within the space available. The outer shell 25 encloses the heat exchange section and the central core of the heat exchanger 100. The outer shell 25 extends from a first end 22 to a second end 24, as shown in FIG. 2. The heat exchanger 100 directs a primary flow H from a primary flow inlet 11a to a primary flow outlet 11b. In the present example, the primary flow H is the main hot fluid flow.

The heat exchanger 100 also directs a secondary flow C from a secondary flow inlet 12a to a secondary flow outlet 12b. In the present example, the secondary flow C is the cold fluid flow to extract heat and regulate the temperature of the hot fluid. It will be appreciated that the primary flow H may be the cold fluid flow and the secondary fluid C may be the hot fluid flow. In addition, the example shown in FIG. 2 shows the primary flow H and the secondary flow C travelling in opposite directions along the heat exchanger 100. It will be appreciated that the primary flow H and secondary flow C may travel in the same direction along the heat exchanger 100.

The secondary flow inlet 12a and secondary flow outlet 12b are shown perpendicular to the heat exchanger, near the first end 22 and second end 24. They may be at different angles to the heat exchanger and at different positions along the heat exchanger.

The secondary flow inlet 12a and secondary flow outlet 12b comprises tubular portions 26 which extend away from an outer surface of the outer shell 25. The tubular portions 26 may be connected to external ducts which are used to provide the secondary flow. In FIG. 2, the tubular portions are shown to be circular in cross section, although they may be other shapes depending on the ducts providing the secondary fluid.

Figure 3:
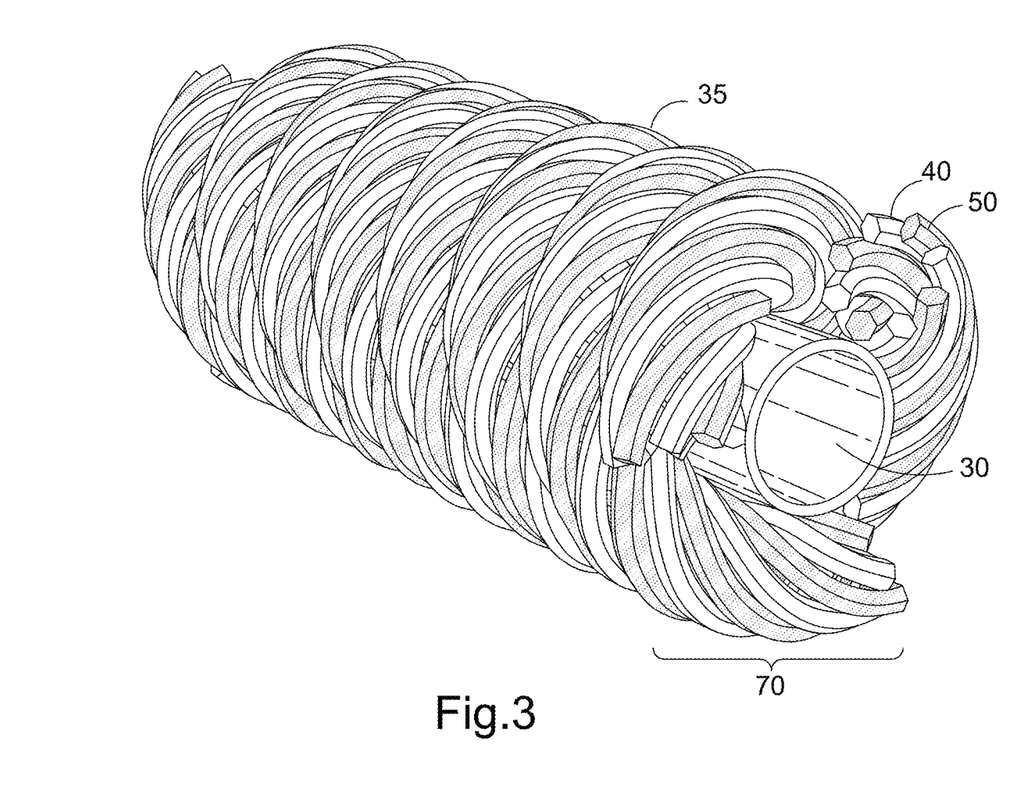
FIG. 3 is a perspective view showing a heat exchange structure with strands wrapped around a core.

FIG. 3 shows the heat exchange section 35 and central core 30 of the heat exchanger 100. The heat exchange section comprises a plurality of primary flow tubes 40 for conveying the primary flow H from a first end 22 to a second end 24. The heat exchange section further comprises a plurality of secondary flow tubes 50 for conveying a secondary fluid C.

The plurality of primary flow tubes 40 and plurality of secondary flow tubes 50 are grouped together to form a strand 70. The strand 70 is then helically wrapped around the central core 30 and extends along the length of the central core 30.

FIG. 3 shows two strands 70 wrapped helically around the central core 30. It is possible for only one strand 70 to be helically wrapped around the central core 30, alternatively there may be three or more separate strands 70 wrapped around the central core 30.

In FIG. 3 the primary flow tubes 40 and secondary flow tubes 50 are provided in a twisted configuration to form the strands 70. It is noted that the heat exchangers described herein may have a twisted configuration provided by a twisting action during manufacture, or alternatively may be formed with a twisted shape such as by moulding, casting, or additive manufacturing in such a shape. The use of wrapping of the strands 70 and, in some examples, twisting of the tubes 40, 50, increases the path length of the tubes and therefore increases the residency times of the primary flow H and secondary flow C, this improving heat transfer. The central core 30 is shown as being hollow allowing it to act as a bypass in the event that heat exchange is not required. In this instance, a valve can be positioned at the primary flow inlet 11a which prevents the primary flow H entering the primary flow tubes 40. Instead the primary flow is diverted through the central core 30 bypass. In this instance the heat exchanger can act as a conventional duct, i.e. without heat exchange.

In FIG. 3, there are an equal number of primary flow tubes 40 and secondary flow tubes 50 for conveying an equal amount of primary flow H and secondary flow C. In certain circumstances it may be required to convey a larger proportion of primary flow H, in which case there may be more primary flow tubes.

FIG. 3 also shows each primary flow tube 40 and secondary flow tube 50 having the same cross sectional area and a circular cross section. Depending on the amount of primary flow H and secondary flow C, the cross sectional area of each tube may differ. Similarly, some of the flow tubs may have different cross section shapes, for example they may be rectangular or other polygonal shapes.

In FIG. 3, the primary flow tubes 40 and secondary flow tubes 50 alternate around the circumference of the strand 70. It is also possible for at least two of the same flow tubes to be adjacent to each other. Additionally each strand 70 in FIG. 3 does not comprise a central flow tube.

Figure 4:
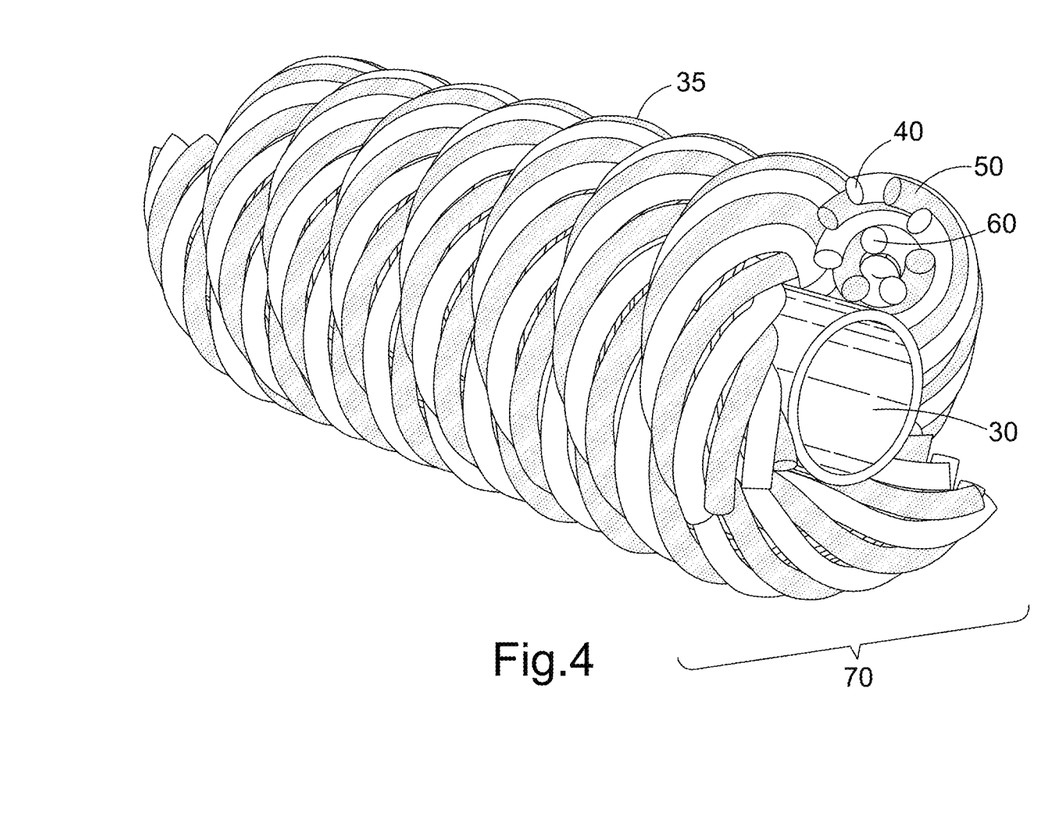
FIG. 4 is a perspective view showing another heat exchange structure with strands wrapped around a core.

FIG. 4 shows another arrangement of the central core 30 and the heat exchange section 35. FIG. 4 shows the hollow central core and the primary flow tubes 40 and the secondary flow tubes 50 grouped together to form strands 70 helically wrapped around the central core 30.

In FIG. 4, the strand 70 also comprises a central flow tube 60. The central flow tube 60 is used to convey the secondary flow C and acts to provide further heat transfer in the duct.

In alternative arrangements, the central flow tube 60 may be for conveying the primary fluid H. The type of fluid present in the central flow tube 60 will depend on the required heat transfer. Even if the central flow tube 60 is present within the strand 70 of the heat exchange section 35, it may not be used to transfer any fluid. Instead it can be left empty, alternatively it may be solid to provide additional structure to the strand 70.

Figure 5:
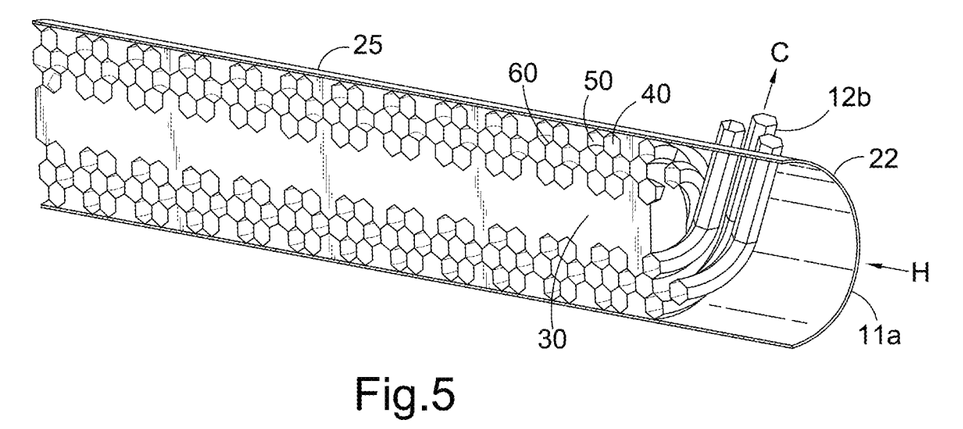
FIG. 5 is a perspective cut-away view showing a heat exchange structure with strands wrapped around a core.

FIG. 5 shows a cut-away view of the heat exchanger 100. In use the primary flow H enters the heat exchanger at inlet 11a on the first end 22 of the duct. The primary flow H then enters the plurality of the primary flow tubes 40 and travels along the length of the heat exchanger 100.

FIG. 5 shows a secondary fluid outlet 12b for conveying the secondary flow C, which is moving in the opposite direction along the duct compared to the primary fluid H. The secondary flow tubes 50 extend through the outer shell 25 of the duct, such that the secondary flow outlet 12b is located outside the heat exchanger 100.

The central core 30 shown in FIG. 5 is solid to provide an additional structure to the heat exchanger 100.

Figure 6:
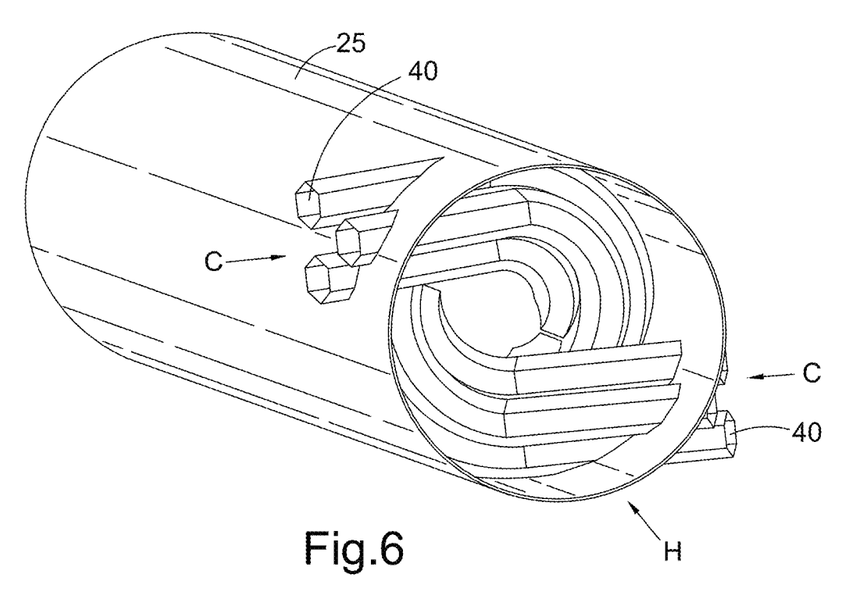
FIG. 6 is a perspective cut-away view showing an inlet/outlet of a heat exchanger.

FIG. 6 is a diagram of the first end 22 of the heat exchanger 100 comprising the outer shell 25 and two sets of secondary flow tubes 40 each forming secondary flow inlets 12a. The secondary flow tubes 40 extend out of the heat exchanger, perpendicular to the longitudinal direction of the heat exchanger. Although not shown in FIG. 6, the secondary flow tubes would be covered by the tubular portion 26, which extends from the outer surface of the outer shell 25.

In FIG. 6 the two secondary flow inlets are for two separate strands 70. In some instances the first end may comprise two secondary flow outlets, or one secondary flow inlet and one secondary flow outlet, depending on the flow direction required.

The primary flow H enters the first side of the heat exchanger 100 at inlet 11a and enters the helically wrapped primary flow tubes 50 within the heat exchange section 35. In FIG. 6, the primary flow H and the secondary flow C travels in the same direction from the first end to the second end. If the first end comprised secondary flow outlets, the primary flow H and the secondary flow C would travel in opposite directions.

Figure 7:
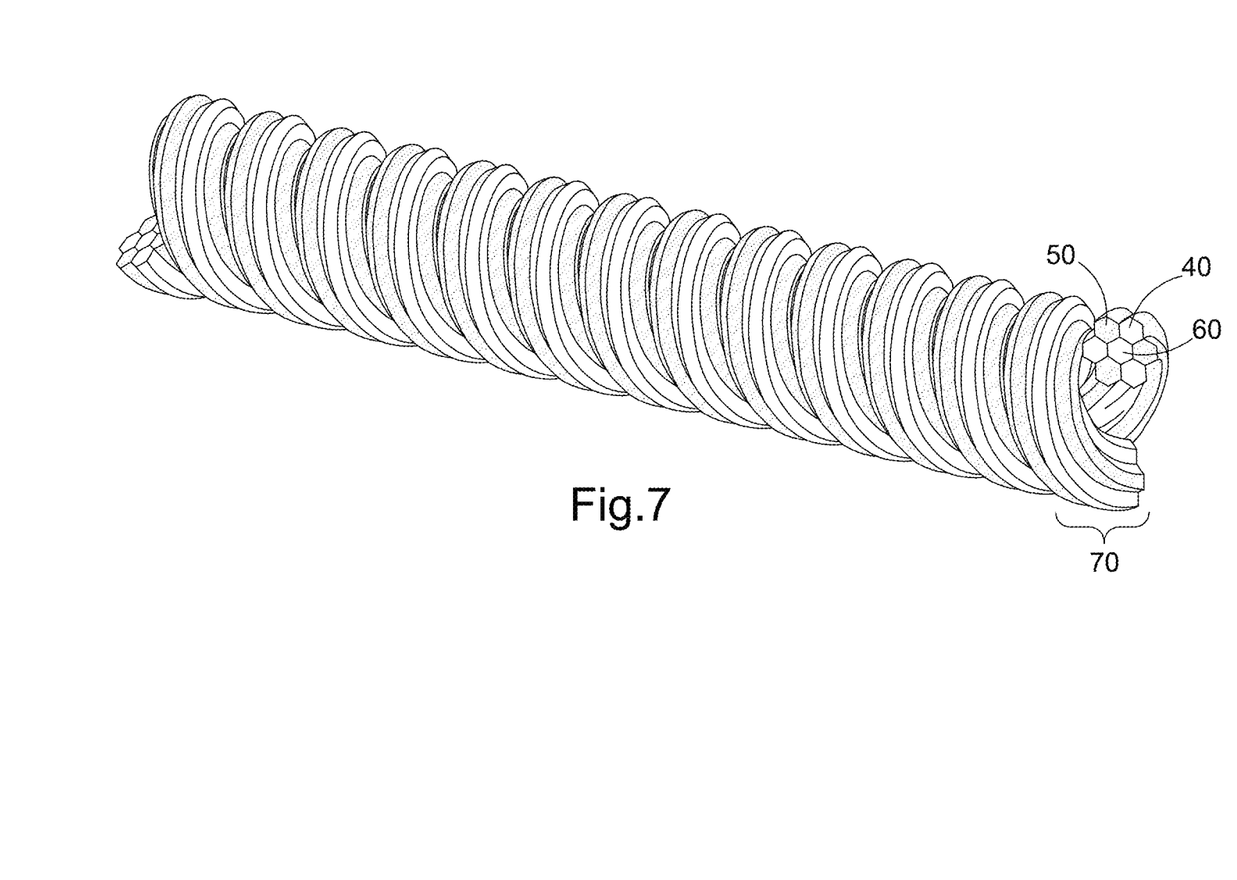
FIG. 7 is a perspective view showing another heat exchange structure with strands wrapped around a core.

FIG. 7 shows another arrangement. In this case each strand 70 is once again formed of a plurality of primary flow tubes 40 and secondary flow tubes 50. However, the primary flow tubes 40 and secondary flow tubes 50 are not twisted together to form the strands 70.

Figure 8:
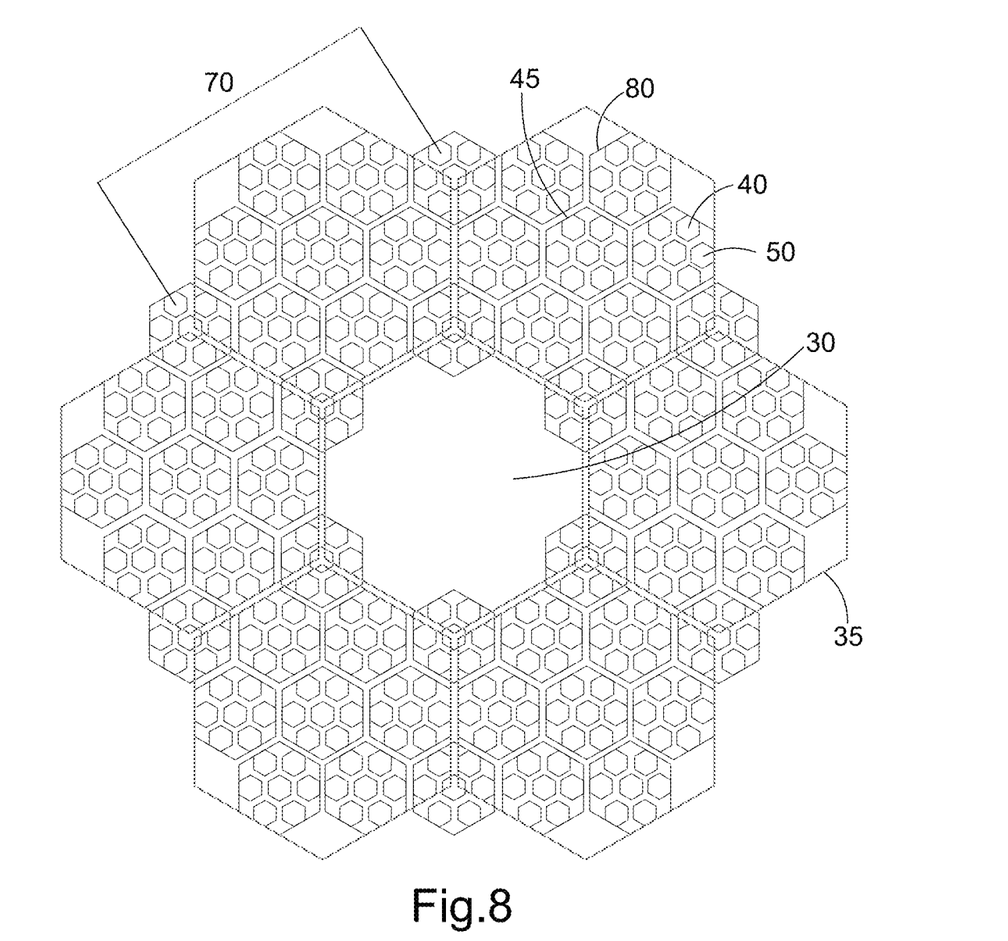
FIG. 8 is a schematic cross-sectional view showing a heat exchange structure with multiple levels of strands wrapped around a core.

FIG. 8 shows a cross section of the heat exchanger 100 showing the heat exchange section 35 and the central core 30. FIG. 8 shows the strands arranged in a plurality of levels. There are six first level strands 70 placed about the circumference of the central core 30 forming a hexagonal-like cross section. Each first level strand 70 is helically wrapped around the central core 30 and also extends along the length of the heat exchanger 100 in a longitudinal direction.

Each first level strand 70 comprises six second level strands 80 helically wrapped around a central core 45 of each first level strand 70. In FIG. 8, the central core 45 of the first level strand 70 is a strand comprising at least one primary flow tube and at least one secondary flow tube. Alternatively, the central core 45 of the first level strand may be a single hollow tube, or simply a space.

Each second level strand consists of six flow tubes. There may be an equal amount of primary flow 40 and secondary flow tubes 50. Alternatively there may be more primary flow tube 40 or more secondary flow tubes 50.

FIG. 8 only shows two levels of strands, however it is possible for more than two levels of strands to be present, where the lowest level of strands each comprises a plurality of primary flow tubes 40 and a plurality of secondary flow tubes 50.

The heat exchanger 100 described herein is typically manufactured using additive manufacturing such as laser bed fabrication. This allows the complex internal structure to be formed easily and also allows for multiple materials to be used.

The type of material used will depend on the required thermal and structural characteristics required. For example superalloys may be used for high temperature applications, while aluminium can be used for low to medium temperature applications. Furthermore, polymers can also be used for low temperature applications and have the further advantage of being flexible given the internal structure of the heat exchanger 100 having relatively thin walls.

The invention claimed is:

1. A heat exchanger extending between a first end and a second end, the heat exchanger comprising:
   a source of primary fluid;
   a source of secondary fluid, wherein the source of secondary fluid is different than the source of primary fluid;
   a central core; and
   a heat exchange section;
   wherein the heat exchange section comprises:
   a primary flow inlet connected to the source of primary fluid and that receives a primary flow;
   a secondary flow inlet connected to the source of secondary fluid and that receives a secondary flow;
   a primary flow outlet;
   a secondary flow outlet;
   a plurality of primary flow tubes for conveying the primary flow from the primary flow inlet to the primary flow outlet; and
   a plurality of secondary flow tubes for conveying the secondary flow from the secondary flow inlet to the secondary flow outlet;
   wherein the primary flow tubes and the secondary flow tubes are grouped together to form at least one strand that is wrapped around the central core in a helical manner;
   wherein the primary flow tubes and secondary flow tubes are configured such that, in use, heat transfer occurs between the primary flow and secondary flow;
   wherein the primary fluid is different than the secondary fluid;
   wherein the at least one strand comprises multiple levels of strands including at least one larger, first level strand, and a plurality of smaller, second level strands; and
   wherein each second level strand comprises at least one of the primary flow tubes and at least one of the secondary flow tubes twisted together to form the second level strand, and wherein the plurality of second level strands are combined into the at least one larger, first level strand.

2. The heat exchanger of claim 1, wherein there are multiple first level strands, each first level strand comprising a respective plurality of flow tubes and each strand being wrapped around the central core.

3. The heat exchanger of claim 1, wherein the central core is hollow to act as a bypass for one of the primary flow and the secondary flow.

4. The heat exchanger of claim 1, comprising an equal amount of primary flow tubes and secondary flow tubes.

5. The heat exchanger of claim 1, comprising a different number of primary flow tubes and secondary flow tubes.

6. The heat exchanger of claim 1, wherein the at least one strand includes a central flow tube that conveys the primary flow or the secondary flow.

7. The heat exchanger of claim 1, wherein the at least one primary flow tube and the at least one secondary flow tube are hexagonal in cross section.

8. The heat exchanger of claim 1, wherein the primary flow and the secondary flow travel in the same direction between the first end and the second end.

9. The heat exchanger of claim 1, wherein the primary flow and the secondary flow travel in opposite directions between the first end and the second end.

10. The heat exchanger of claim 1, wherein the heat exchanger comprises one or more bends between the first end and the second end.

11. A method of making a heat exchanger comprising a first end and a second end, the method comprising:
   providing a source of primary fluid;
   providing a source of secondary fluid, wherein the source of secondary fluid is
   different than the source of primary fluid; and
   forming a central core and a heat exchange section;
   wherein the heat exchange section is formed with;
   a primary flow inlet connected to the source of primary fluid and that receives a primary flow;
   a secondary flow inlet connected to the source of secondary fluid and that receives a secondary flow;
   a primary flow outlet;
   a secondary flow outlet;
   a plurality of primary flow tubes for conveying the primary flow from the primary flow inlet to the primary flow outlet; and
   a plurality of secondary flow tubes for conveying the secondary flow from the secondary flow inlet to the secondary flow outlet;
   wherein the heat exchange structure is formed so that the primary flow tubes and the secondary flow tubes are grouped together to form at least one strand;
   wherein the at least one strand is helically wrapped around the central core;

wherein the primary flow tubes and secondary flow tubes are configured such that, in use, heat transfer occurs between the primary flow and secondary flow;

wherein the primary fluid is different than the secondary fluid;

wherein the at least one strand comprises multiple levels of strands including at least one larger, first level strand, and a plurality of smaller, second level strands; and wherein each second level strand comprises at least one of the primary flow tubes and at least one of the secondary flow tubes twisted together to form the second level strand, and wherein the plurality of second level strands are combined into the at least one larger, first level strand.

12. The method as claimed in claim 11, wherein the heat exchanger is formed by an additive manufacturing process.

* * * * *